United States Patent [19]

Turcheck, Jr. et al.

[11] Patent Number: 4,784,493

[45] Date of Patent: Nov. 15, 1988

[54] ELEMENT RECOGNITION AND ORIENTATION

[75] Inventors: Stanley P. Turcheck, Jr., Homer City; James P. Martin, Blairsville; Arthur L. Dean, Indiana, all of Pa.

[73] Assignee: FMC Corporation, Chicago, Ill.

[21] Appl. No.: 873,232

[22] Filed: Jun. 11, 1986

[51] Int. Cl.[4] .............................................. G01B 11/00

[52] U.S. Cl. .................................... 356/394; 209/577; 209/586; 364/559; 364/560

[58] Field of Search ................ 356/394; 209/586, 598, 209/577; 364/478, 479, 552, 559, 560, 564

[56] References Cited

U.S. PATENT DOCUMENTS

| | | | |
|---|---|---|---|
| 4,187,545 | 2/1980 | Wallace et al. | 364/478 X |
| 4,435,837 | 3/1984 | Abernathy | 356/394 X |
| 4,575,637 | 3/1986 | Sullivan, Jr. | 356/394 X |

*Primary Examiner*—F. L. Evans

*Attorney, Agent, or Firm*—Douglas W. Rudy; Richard B. Megley

[57] ABSTRACT

A material handling work piece orienter utilizes an array of optical sensors to sense work piece orientation and other characteristics and determines the status of the work piece preparatory to taking action on said work piece. The orienter has the flexibility to be taught numerous work piece orientations and characteristics in a short time with a selective degree of accuracy.

3 Claims, 11 Drawing Sheets

GENERAL FLOW CHART

LEARN FLOW CHART

FIG_10

DISPLAY PART2
ORIENTATION 1

```
1110001010000000   1111101110000000   ###  +# #+++++++
1111111111000000   1111111111000000   ##########++++++
1111111111000000   1111111111000000   ##########++++++
1111111111000000   1111111111000000   ##########++++++
1111111111000000   1111111111000000   ##########++++++
1111111111000000   1111111111100000   ########## +++++
1111111111100000   1111111111100000   ###########+++++
1111111111100000   1111111111100000   ###########+++++
1111111111110000   1111111111110000   ############++++
1111111111110000   1111111111111000   ############ +++
1111111111111000   1111111111111000   #############+++
1111111111111000   1111111111111100   ############# ++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ######### ####++
1111111000001100   1111111110111100   #######  +  ##++
1111110000001100   1111111000001100   ###### +++++##++
1111110000001100   1111110000001100   ######++++++##++
1111110000000100   1111110000001100   ######++++++ #++
1111110000000100   1111110000000100   ######+++++++#++
1111110000000100   1111110000000100   ######+++++++#++
1111110000000100   1111110000000100   ######+++++++#++
1111110000000100   1111110000000100   ######+++++++#++
1111110000000100   1111110000001100   ######++++++ #++
1111110000000100   1111110000001100   ######++++++ #++
1111110000001100   1111111000001100   ###### +++++##++
1111111000001100   1111111000011100   #######++++ ##++
1111111000001100   1111111100111100   ####### ++   ##++
1111111100111100   1111111111111100   ########  ####++
1111111111111100   1111111111111100   ##############++
1111111111111100   1111111111111100   ##############++
1111111111111100   1111111111111100   ##############++
1000000000000000   1100001010101000   # ++++ + + + +++
```

FIG_11

```
1110001010100000   1110001011101000   ###+++#+# #+ +++   DISPLAY PART2
1111111111111000   1111111111111000   #############+++   ORIENTATION  2
1111111111111000   1111111111111100   ############# ++
1111111111111100   1111111111111100   ##############++
1111111111111100   1111111111111100   ##############++
1111111110111100   1111111111111100   ######### ####++
1111111000011100   1111111110111100   #######  + ###++
1111111000001100   1111111100011100   ####### +++ ##++
1111110000001100   1111111000001100   ###### +++++##++
1111110000001100   1111110000001100   ######++++++##++
1111110000000100   1111110000001100   ######++++++ #++
1111110000000100   1111110000000100   ######+++++++#++
1111110000000100   1111110000000100   ######+++++++#++
1111110000000100   1111110000000100   ######+++++++#++
1111110000000100   1111110000000100   ######+++++++#++
1111110000000100   1111110000001100   ######++++++ #++
1111110000001100   1111111000001100   ###### +++++##++
1111110000001100   1111111000001100   ###### +++++##++
1111111000001100   1111111100111100   ####### ++  ##++
1111111100111100   1111111111111100   ########  ####++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111100   1111111111111100   ##############++
1111111111111000   1111111111111100   ############# ++
1111111111111000   1111111111111000   #############+++
1111111111110000   1111111111111000   ############ +++
1111111111110000   1111111111110000   ############++++
1111111111100000   1111111111110000   ########### ++++
1111111111100000   1111111111100000   ###########+++++
1111111111000000   1111111111100000   ########## +++++
1111111111000000   1111111111000000   ##########++++++
1111111111000000   1111111111000000   ##########++++++
1111111111000000   1111111111000000   ##########++++++
1000000000000000   1100001110000000   # ++++   +++++++
```

ELEMENT RECOGNITION AND ORIENTATION

BACKGROUND AND SUMMARY OF THE INVENTION

This invention has to do with a method and apparatus for the orientation and inspection of parts or work pieces in high volume manufacturing applications. Work pieces are individually inspected and either reoriented or rejected by a reorienter. The apparatus incorporates a sensing device that "reads" the orientation of a work piece and compares it with a previously learned orientation stored in the memory of a central processor. The stored preferred orientation is defined by inner and outer envelopes of data information which are initially taught to the processor memory by an operator feeding parts of a known orientation to the work piece reorienter. Upon the operator's determination, based on a confidence level programmed into the software, that a sufficient number of correctly oriented samples have been screened by the computer the reorienter is prepared to process work pieces on its own and make its own determination as to whether a part meets the parameters of the learned orientation with a resulting mechanical action to follow.

BRIEF DESCRIPTION OF THE DRAWING FIGURES

The invention is shown, by way of example, in the accompanying drawings, in which:

FIG. 10 is a digital representation inner and outer envelopes of a part in a first orientation;

FIG. 11 is a digital representation of inner and outer envelopes of a part in a second orientation.

DESCRIPTION OF A PREFERRED EMBODIMENT

Figures 1, 2:
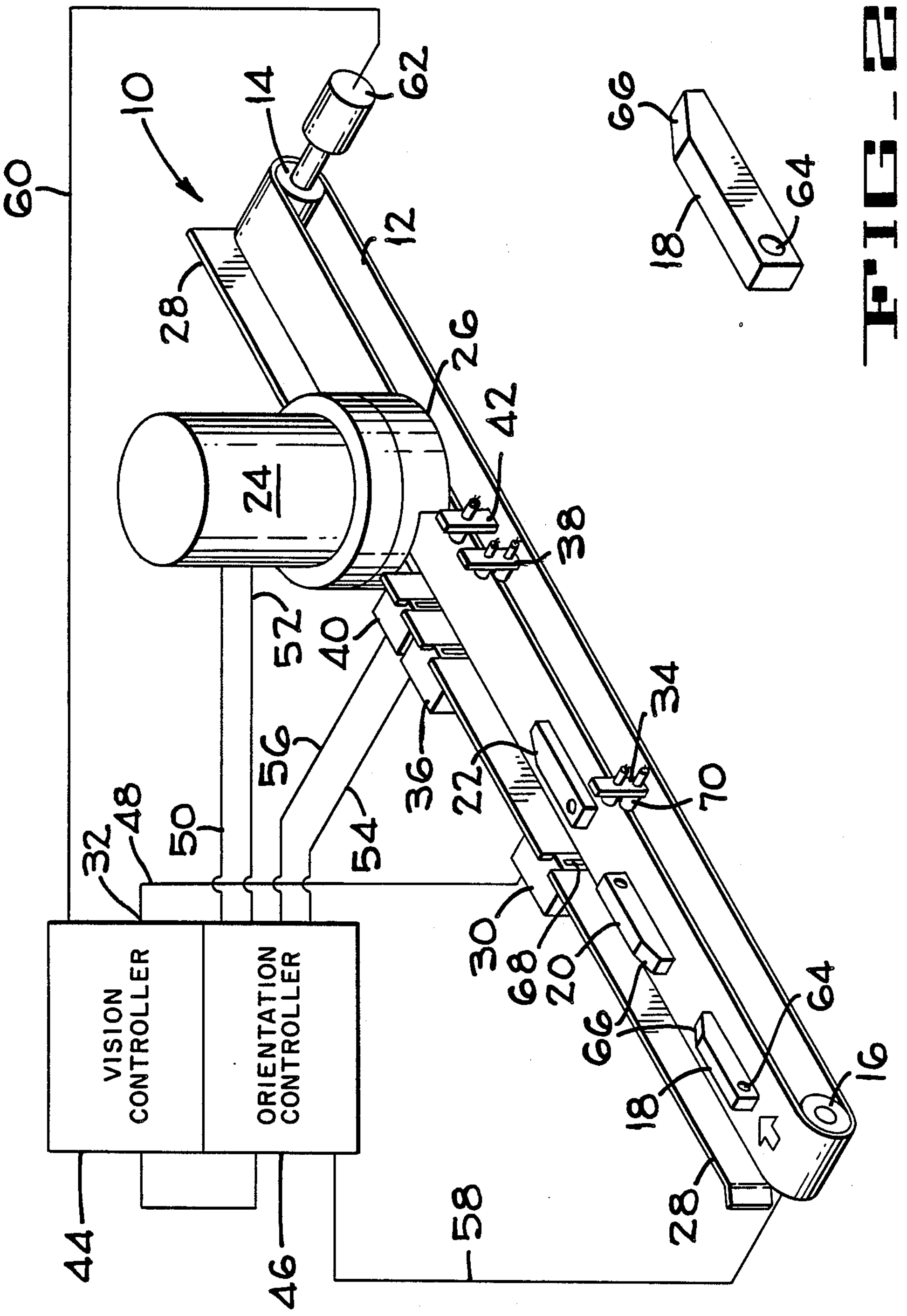
FIG. 1 is a representation of a work piece server and reorienter.
FIG. 2 is a isometric view of a representative work piece.

The general environment of the reorienter is pictorially shown in FIG. 1 wherein the reorienter system generally 10 comprises a frame supported continuous belt 12 entrained around a driver roll 14 and an idler roll 16. Work pieces such as 18, 20 and 22, each similar parts in different orientations, will be placed on the belt to be served to a reorienter means 24. The simplest form of reorienter means is shown in this figure, that being a stepping motor driven single axis (Y-axis) reorienter having a lower chamber 26 that can be rotated one hundred and eighty degrees. The embodiment shown is rather simplistic so as to not overly complicate this specification however it is contemplated that a multiple axis reorienter means and multiple position reorienter means could be incorporated where numberous reorientations would be desirable. Such modifications are contemplated to be within the work piece recognition and reorientation scheme claimed herein.

Adjacent the continuous belt 12 at one edge thereof is a fence 28 running the length of the belt but having several breaks therein. On the inbound side of the reorienter means 24 there is a first break in the fence to accommodate a recognition sensor 30 which is a $16\times1$ array of vertically stacked fibre optic filaments connected to sixteen individual phototransistors each having a hard wired connection to a vision controllers' 32 input port. An infrared light source 34 composed of dual infrared LEDs adjusted to different angles are directly across the belt from the recognition sensor 30 and provide the necessary illumination to switch the phototransistors related to each of the sixteen fibre optic filaments.

The second break in the fence 28 is provided to accommodate a first infrared thru beam optical switch composed of a receiver 36 and a light source 38.

Immediately prior to the entry port of the orienter mens 24 there may optionally be positioned, at a third break in the fence 28, a second infrared thru beam optical switch means having a receiver 40 and a light source 42.

The recognition sensor communicates via a conduit with a vision controller generally 44 which in turn is in communication with an orientation controller generally 46.

As is schematically represented by conduit line 48, the vision controller is sired to at least the recognition sensor, while the orientation controller is wired to at least the recognition sensor, while the orientation controller is wired to at least the reorienter means and the infrared thru beam optical switches 30, 36 and 40 through conduits 50, 52, 54 and 56 respectively. Conduit 58 communicate movement of the belt 12. Conduit 60 connects the vision controller 44 to a shaft encoder generally 62.

The sample work piece chosen for explanatory purposes of this specification is shown in FIG. 2. The generally elongate article is rectangular in cross section and is provided with a through aperture 64 at one end thereof and an inclined planer surface 66 at a second end thereof.

In operation, work pieces coming down the conveyor belt are to be inspected for conformity with a desired and acceptable work piece, and if acceptable, are to be reoriented so that, for instance, all the acceptable work pieces leave the discharge side of the reorienter means facing the same direction. The sample work piece orientation shown by work piece 18 has arbitrarily been chosen to be Orientation 1 while the sample work piece 20 is shown in Orientation 2.

Firmware resident in the programmable controller 44 is "taught" the acceptable characteristics of a work piece prior to production run as well a acceptable orientations of work pieces.

Figure 3:
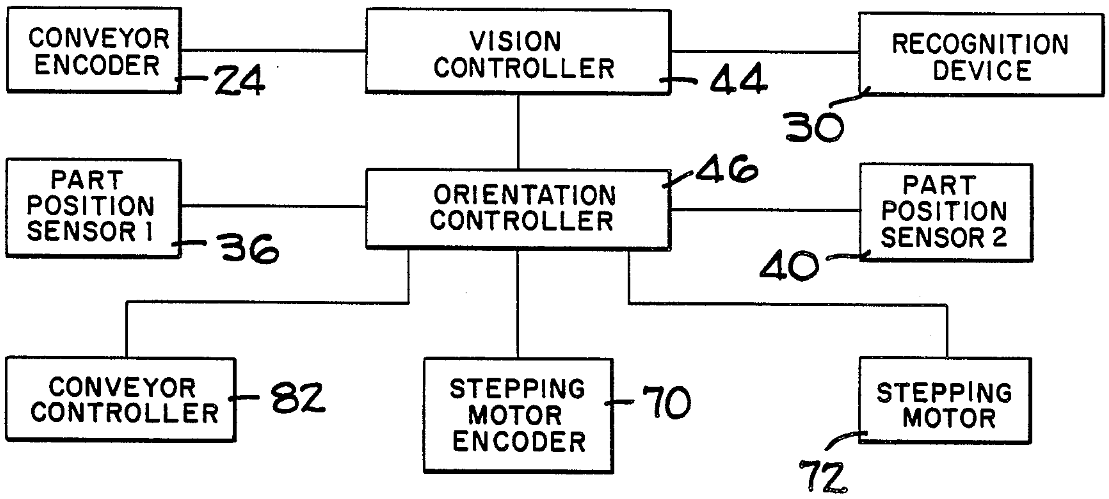
FIG. 3 is a block diagram of an intelligent recognition and reorientation system.

FIG. 3 shows a representation of the communications between the various inputs and the vision controller 44 and the orientation controller 46. A conveyor encoder 24 senses the speed of the belt 12 and delivers the belt speed to the vision controller 44. As the speed of the belt is important information since the number of vertical scans of the work piece will be increased or decreased depending on the belt speed. Thus, to insure that once setup, the rate of scan or number of scans per object remains constant for a series of similar articles, the belt speed must be controller.

The vision controller contains diagnostic programming that monitors key system components such as memory, the recognition device, and communications between the orientation controller, the vision controller itself and possible external control systems.

The vision controller 44 receives and sends information to the recognition device 30. The recognition device 30 is an optical sensor consisting of a single vertical array (68 in FIG. 1) of sixteen fiber optic leads connected to photodetectors molded in an epoxy form and mounted in an enclosure. The standard recognition device operates in a "silhouette" mode, that is the infrared light source 34 is directly opposed to the sensor array with parts passing between the sensor array and the light source.

As an alternative to the silhouette mode of operation the recognition device may be operated in a retro-reflective mode, bouncing light off the part from the same side as the light detectors. The recognition device could also operate in a specular reflective mode bouncing light off the part at various angles.

The first work piece position sensor 36 and the second work piece position sensor 40, along with the light sources 38 and 42 respectively communicate with the orientation controller 46.

The actual orienter shown in the FIG. 3 block diagram as blocks 70 and 72 receives a signal from the orientation controller 46 through its communication link thereto. The stepping motor is the drive for a standard orienting mechanism shown generally as 24 in FIG. 1 comprising a single axis device that can rotate work pieces 180 degrees or divert work pieces to one of several lanes.

An alternative part orienter has also been designed to rotate a part about two axes thus being able to accept a part arriving in any one of four possible orientations. The part orienter may also be used as a sorting mechanism expelling wholly different parts in two or more discharge chutes depending on the part orientation.

In any case the stepping motor 72 will receive a signal to "step" from the orientation controller. The stepping motor encoder 70, a conventional shaft encoder, will convey the up-to-date position of the stepping motor to the orientation controller.

The orientation controller 46 will also provide the motor speed control signal to the conveyor 82 to either increase or decrease the speed of the belt depending on the belt speed as relayed to the vision controller from the conveyor.

Figure 4:
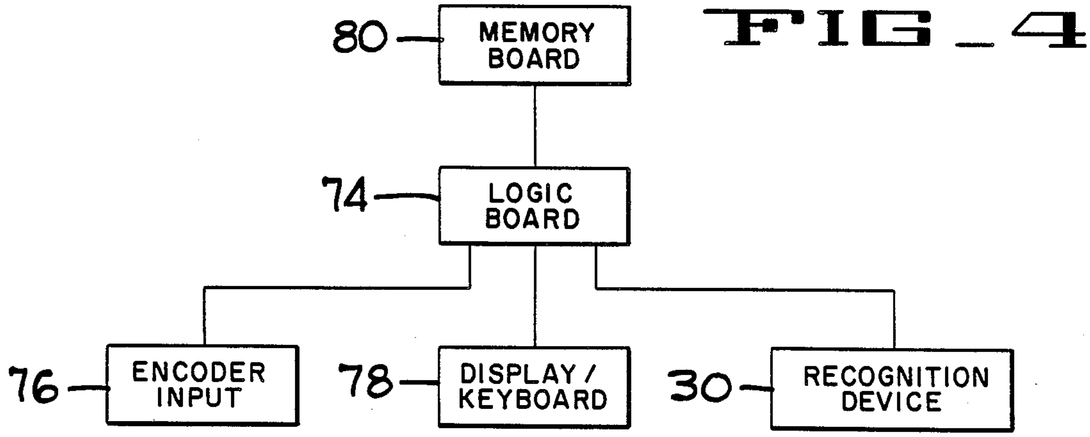
FIG. 4 is a block diagram of the communications links between input devices and logic system.

FIG. 4 is a processor logic and memory block diagram. The logic board 74 receives inputs from the encoder input 76, that is, the belt shaft encoder 14, and the stepping motor encoder 70; a keyboard 78 and the recognition device 30. It also delivers outputs to the display which is integral with the keyboard 78. The logic board 74 communicates inputs and outputs to and from the memory 80.

Figure 7:
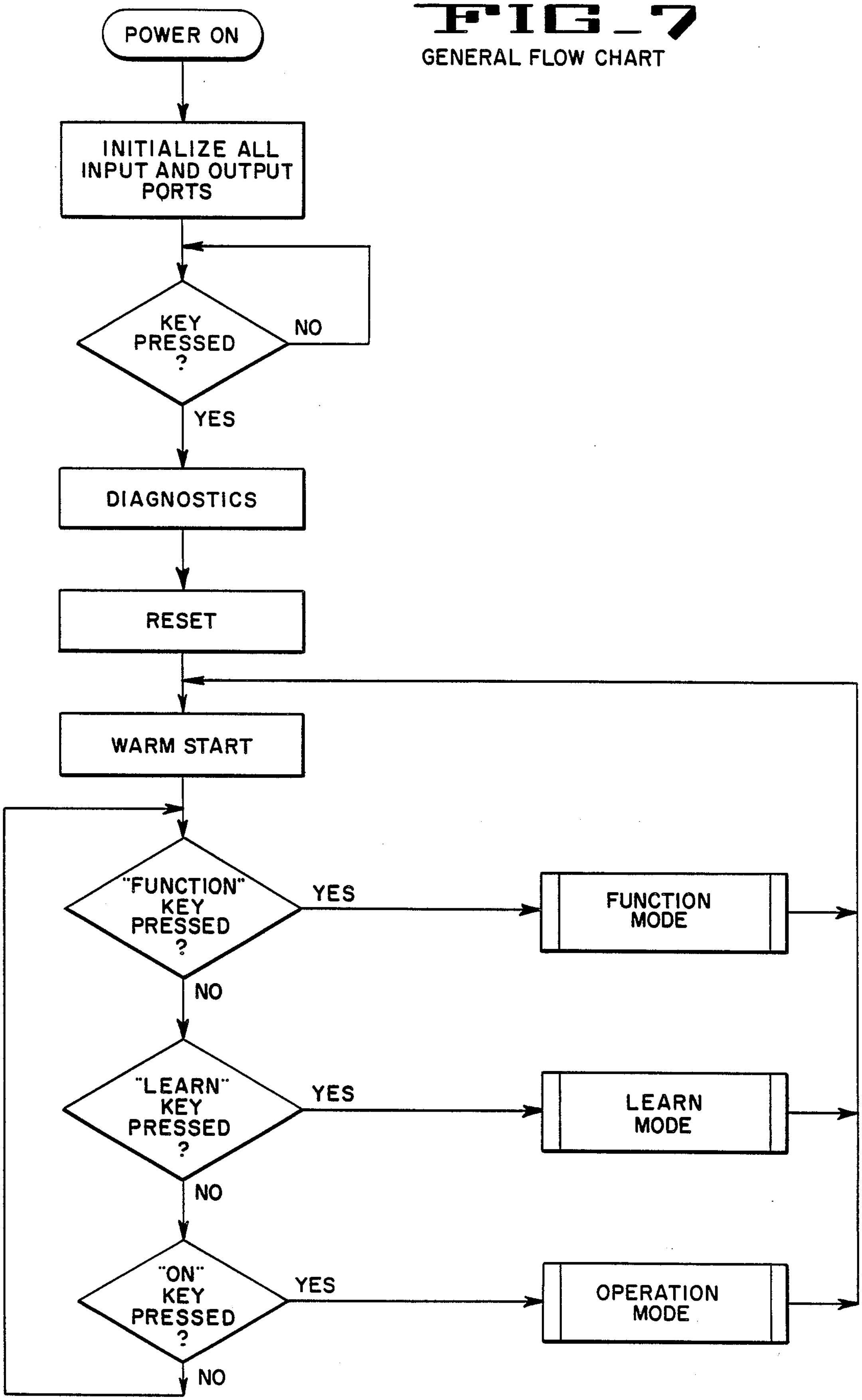
FIG. 7 is a general flow chart of the system at startup.
Figure 8A:
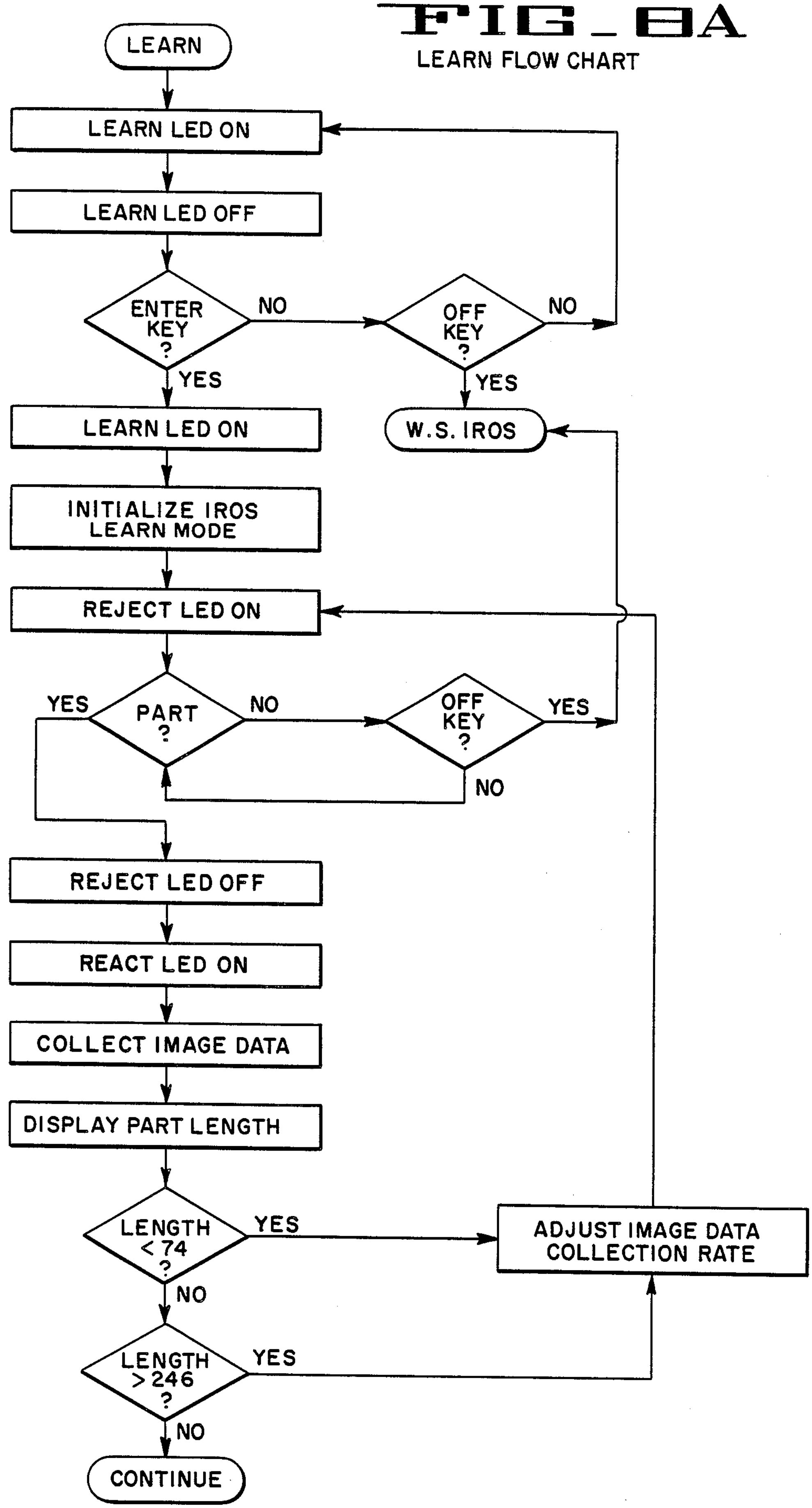
FIG. 8 is a flow chart of the learn mode of the system.
Figure 8B:
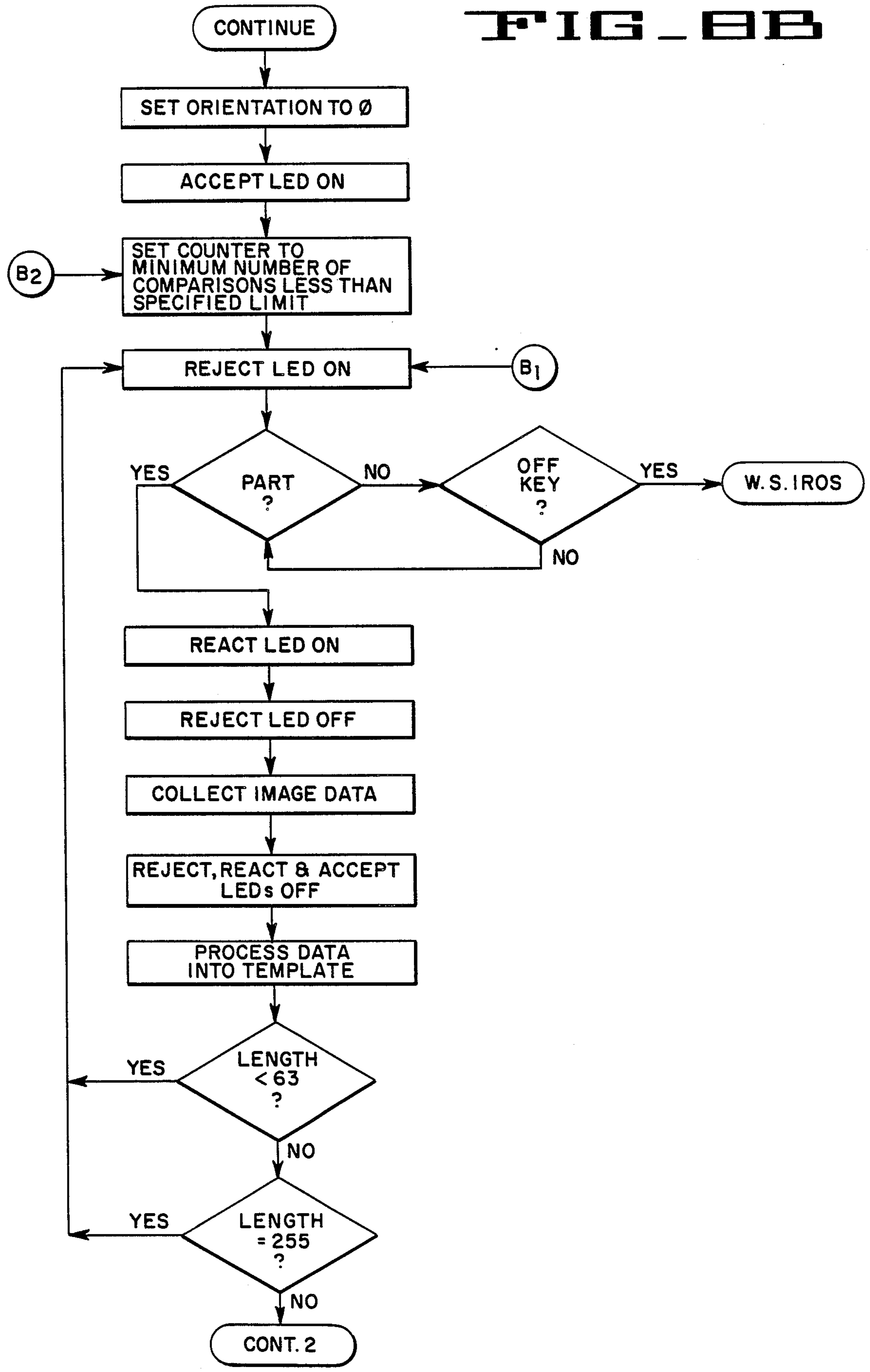
Figure 8C:
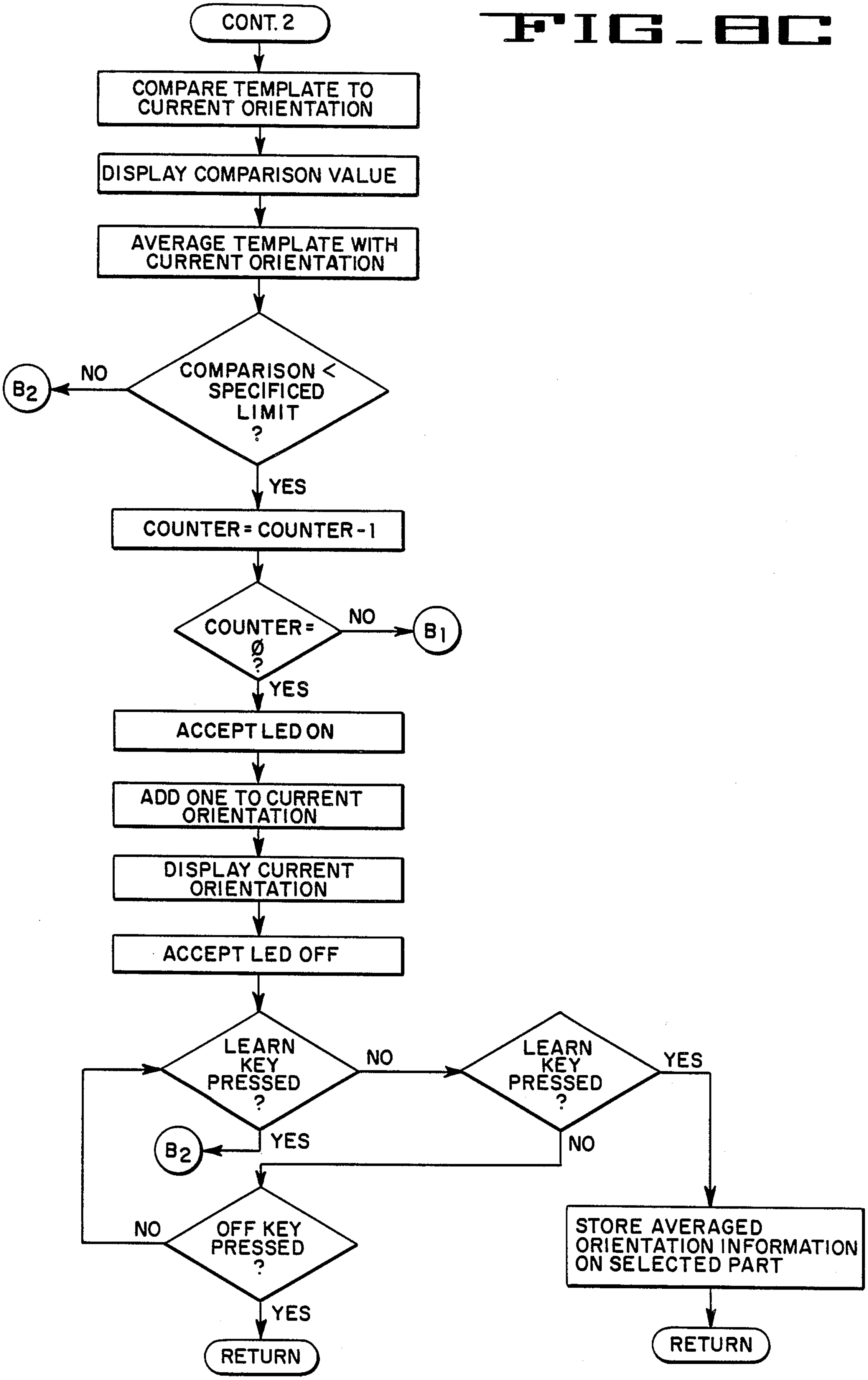
Figure 9A:
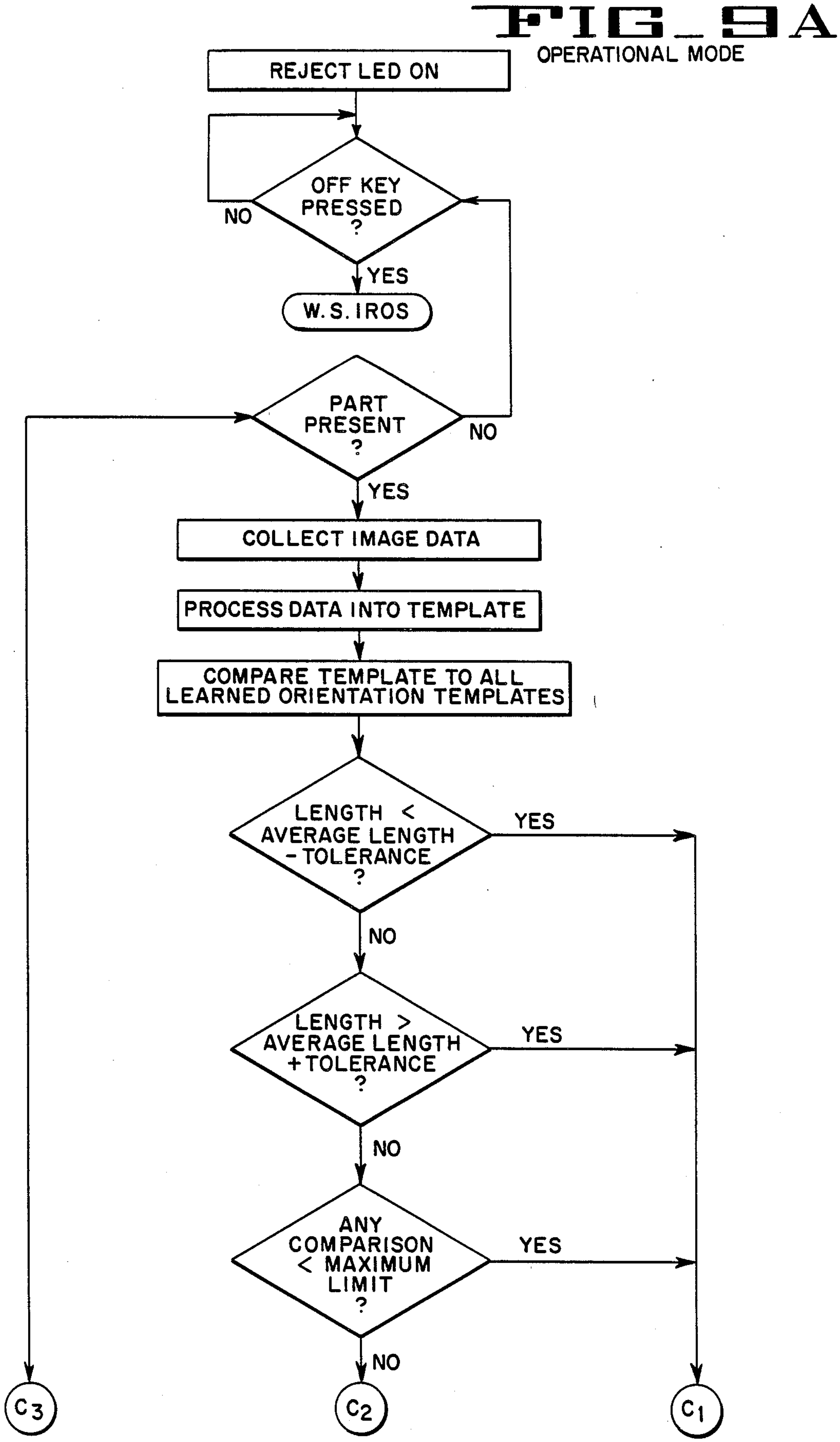
FIG. 9 is a flow chart of the operation mode of the system.
Figure 9B:
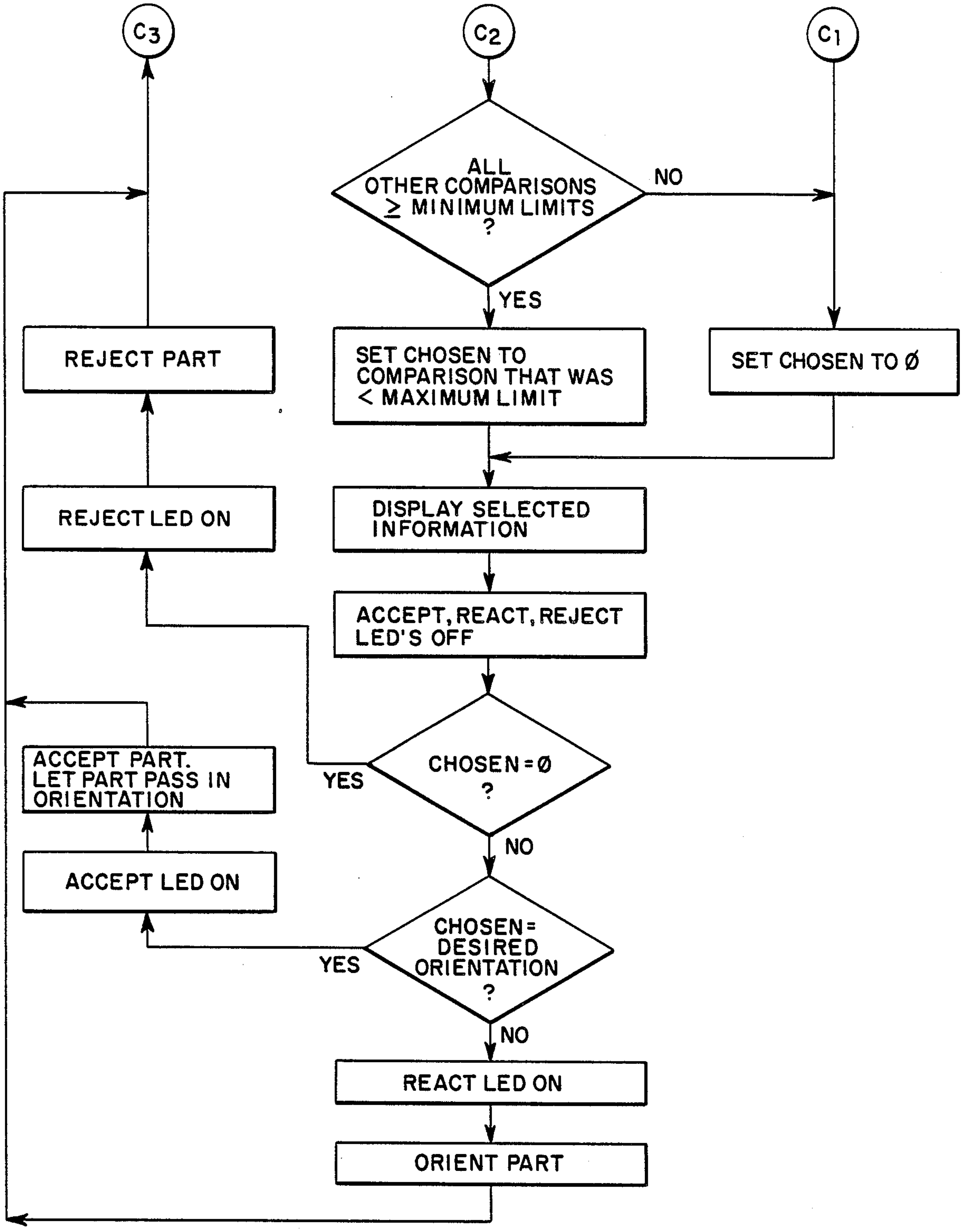

The flow charts presented by FIGS. 7, 8 and 9 present the logic used in the reorienting system and will be explained with the expectation that the explanation of the flow charts will enable a person having ordinary skill in the art to understand the operation of the reorienter.

Figure 5:
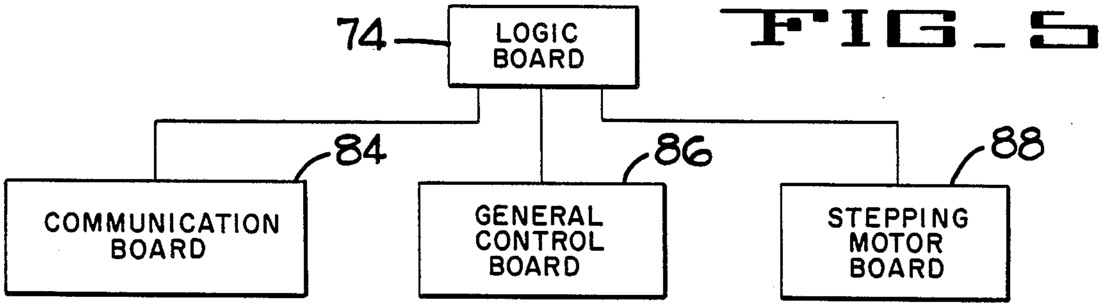
FIG. 5 is a block diagram of the interaction capable between the logic system and its inputs.

FIG. 5 presents the three areas controlled by the logic board 74. These are the communication board 84, the general contract board 86 and the stepping motor board 88.

Figure 6:
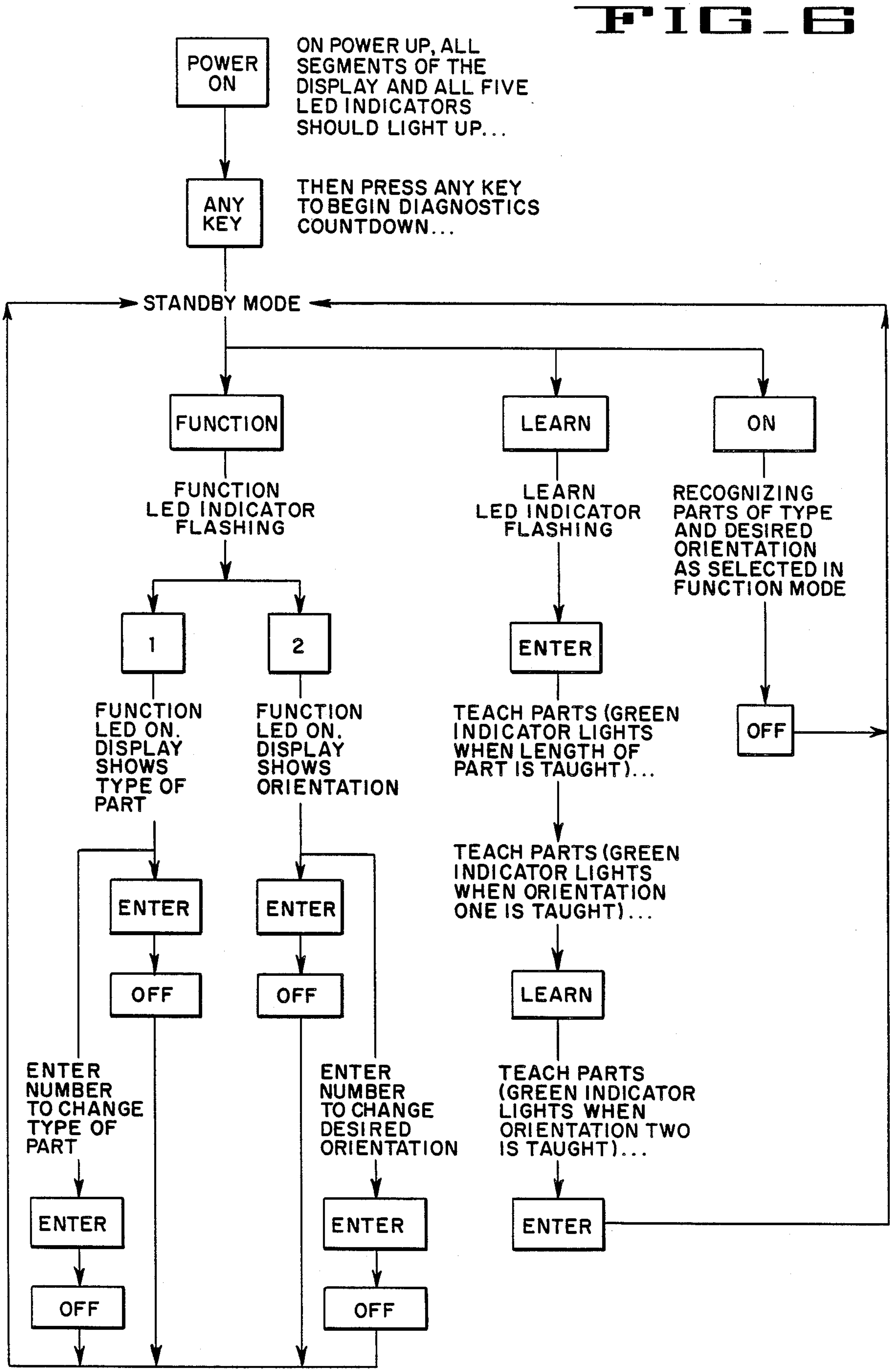
FIG. 6 is a diagram of the setup and operation of the system as presented to the operator.

The operation of the system can best be appreciated by a "walk through" of a set up of the system to learn and process a part. FIGS. 6 and then FIGS. 7, 8 and 9 are all flow charts that disclose the logic process of the system. A key pad of typical 4×4 matric has digits 1–9 and six special keys including a clear key, enter key, off key, on key, function key and learn key. The enter key is multipurpose in that it operates differently depending on selected mode of operation and a display unit, including a three digit numerical display and five LEDs, (not shown) are part of the hardware of the system and provide an operator with a means of inputting commands and following the progress of the set up.

To operate the system the following action will be taken:

The power switch on the key pad/display unit is moved to the "ON" position. At this point the three digit display should show "888" and five LED indicators on the front of the unit should be on. Pushing any key at this point will begin the diagnostic routines. The logic will first check its memory for storage and recall capability. After completing the initial memory diagnostics, a final check is made at this point on the non-volatile RAM to insure proper retention of data during power loss. The non-volatile RAM is compared to a setup ROM (read only memory). An exact match will cause a "255" to appear momentarily on the display.

The optical recognition device is next in the test. The unit will check the device for ten seconds. During this time the display will count down from ten. If anything unusual is seen by the camera or the off key is pressed, the display will return to ten.

After a one is seen on the display the orientation controller will be checked by the vision controller. When the orientation controller is ready, the vision controller sends the reset command to the orientation controller and displays a zero. At this point, the vision controller's starting diagnostic procedures have been completed and the unit is in a "STAND BY" mode waiting for keypad entries.

As stated above the keypad has special keys whose functions are as follows:

During operation of the unit, the learn key, the on key, and the off key are normally used. The function key is provided for changing system operating parameters. The following is a detailed description of these special keys.

The on key is used to place the unit into "Operation"-'mode. When it is depressed the red reject LED indicator will light indicating that the vision controller is ready to process parts. Operation is stopped by pushing the off key. At the same time, signals are provided to external device controllers to indicate that the unit has become operational. These signals can be used for various interlocks depending on system configuration. In operation, the system will recognize and orient parts moving past the optical recognition device. In the operation mode, the unit will normally display the orientation of the part and light the accept, react or reject LED indicators depending on the decision made by the vision controller. A zero on the display indicates that the unit did not recognize the part and that the part will be rejected by the system. The green accept LED indicator will be on when the part is in the desired orientation (normally orientation one). All other recognized part orientations are indicated by the yellow react LED indicator. The displayed information and the desired orientation can be easily changed using the function mode. See the description of function mode later in this section for details on changing system parameters.

The learn key is used to enter the "LEARN" mode which allows the user to teach the system new part orientations. It is important that a part number be selected prior to entering the LEARN mode by using Function 1 described below. Note that the off key may be pressed and the learn mode aborted without loss of previously taught information at any time during the learn mode. When the learn key is pressed the red LED indicator next to it will be flashing. Pressing the enter key at this point will change the indicator to a steady "on" condition and start the learning process. The red reject LED indicator will also light at this time and the display will show a zero, indicating that the unit is waiting for parts. At this point the operator will feed a part having the desired orientation (one) past the optical recognition device. As the part moves by the optical recognition device the accept, react and reject LED indicators light indicating that the unit is collecting the image data on the part. The display will immediately show a number corresponding to the length of the part. The display will immediately show a number corresponding to the length of the part. If the number on the display is between 74 and 246 inclusive, the accept and reject LED indicators will light. The green accept LED indicator shows that the unit has adjusted itself to properly collect the image data for this particular part. The red reject LED indicator means that the unit is waiting for more parts. If the green accept LED indicator does not light, more passes are required in order for the unit to adjust itself to read the part. After this adjustment is completed, the unit will start to collect and average the image data of this orientation of the part. As parts are fed through the system, a numerical value comparing the collected image data with the averaged data will appear on the display. The first number shown on the display will be a 255 indicating that no image data was available for comparison. As the data image for each part is collected and averaged, the trend of the comparison values appearing on the display will be towards zero, indicating that the system has acquired sufficient data to recognize the part orientation. The operator will continue to feed parts of orientation one until the green accept LED indicator remains on. typically ten values in succession of less than four are required before the accept condition occurs. When the green accept LED indicator is on, the three digit display will show the number the vision control unit uses to reference the orientation that was just taught. Other orientations of the same part (up to six) can be learned at this point by pressing the learn key and repeating the steps for orientation one. Each time the display and LED indicators will act as previously described for orientation one. When all of the required orientations are taught , the operator presses the enter key to enter the part image data in non-volatile RAM memory for the currently selected part number, and to exit the learn mode session. Note this procedure replaces data previously stored in the non-volatile RAM for the same part number. This "LEARN" function is shown in FIG. 6 by the central path under the LEARN box and in the LEARN flow chart FIG. 8.

The function key, the first column of FIG. 6, is used to place the unit into "FUNCTION" mode. Function mode is indicated by the flashing function LED indicator. It can be exited by pressing the off key, returning the system to the "STAND BY" mode. In the function mode, several advanced features are available for viewing and changing system parameters. The parameters affected by functions are described in the following paragraphs. Pressing a number key while in the function mode normally displays the current value of a parameter. This parameter value can be placed back into memory by pressing the enter key or changed by first keying in the new value, then pressing the ENTER key. Functions having multiple parameters are handled by optionally changing the first parameter's value, pressing the ENTER key and repeating this process for the others in succession, until all parameters for the FUNCTION have been edited. During displaying/editing, the function LED indicator will not flash. The operator is returned to the function mode after modifications are completed as indicated by resumption of the flashing LED indicator.

Function number 0 is used to select what is displayed during operation mode while the unit is feeding parts. The following list describes the selection of parameters:

Changing the parameter to a 0 (normally selected) displays a value corresponding to the orientation number of the part.

Changing the parameter to a 1 displays a value corresponding to the length of the part.

Changing the parameter to a 2 displays a value for the part compared to the averaged image data for orientation one.

Changing the parameter to a 3 displays a value for the part compared to the averaged image data for orientation two.

Changing the parameter to a 4 displays a value for the part compared to the averaged image data for orientation three.

Changing the parameter to a 5 displays a value for the part compared to the averaged image data for orientation four.

Changing the parameter to a 6 displays a value for the part compared to the averaged image data for orientation five.

Changing the parameter to a 7 displays a value for the part compared to the averaged image data for orientation six.

Changing the parameter to a 8 displays a value for the part compared to the averaged imaged data for orientation seven.

Press the ENTER key to return to "FUNCTION" mode.

Function 1 is used to select which part number is to be used by the system for the "LEARN" and "OPERATION" modes. Different memory is used for each part number, allowing easy storage and selection of multiple parts. To use, set the parameter to the desired part number. Systems with the standard memory configuration allow for storage of one part number with seven orientations. The parameter is set to zero for this configuration. Optional memory is available for multiple part storage. Press the enter key to return to "FUNCTION" mode.

Function 2 allows the user to select a desired orientation from those taught to the system for the currently selected part number. The parameter for Function 2 can be set for orientation numbers ranging from one to seven. This parameter is normally set to accept orientation one during "OPERATION" mode. Note that when the part number is changed using Function 1, Function 2 should be used to confirm that this parameter is set to the desired orientation number. Press the ENTER key to return to "FUNCTION" mode.

Function 3 is used to check the operation of the recognition device. The standard system uses an optic sensor 30 having sixteen elements in a linear array. The display will show "16" if all elements are receiving light. If all of the elements are not receiving sufficient light, the display will show "0". Operation of each element can be checked by slowly covering one at a time and watching the display countdown to zero from sixteen.

Function 4 resets the non-volatile RAM system that contains all system parameters and the image data of part number zero to factory settings. Note, all previous system parameters and image data for part zero is replaced. The numbers on the display scroll while the unit is copying the information to the non-volatile RAM from the ROM containing the factory settings.

Function 5 allows a tolerance to be set on the number that corresponds to the length of the parts. This tolerance parameter is applied to the averaged length number as determined during "LEARN" mode to set acceptance limits. The length number collected during the "OPERATION" mode is tested against these acceptance limits. Parts with length numbers outside of these limits will be rejected by the system. Function 5 is used to change the acceptance limits depending on the constraints of the application. Normally, this parameter is set to "10" for a moderate acceptance limit suitable for most orientation determinations. If close length gauging is required, lower this parameter as needed. Conversely, the parameter can be increased to open the limits for parts where wide variations in length are acceptable.

Function 6 is a multiple parameter function that changes the tolerances applied to the comparison values for recognition decisions during the "OPERATION" mode, the current image data is compared to the averaged image data for each orientation that was collected during the "LEARN" mode. For an orientation to be recognized, its comparison value must be less than the first parameter value and the comparison values for all other orientations must be greater than the second parameter value. If these conditions are not met, the system will reject the part. Normally, the first parameter is set to "10" for a moderate acceptance limit suitable for most orientation determinations. Normally, the second parameter is set to "20" for a moderate acceptance limit suitable for most orientation determinations. If close image gauging is required, lower the first parameter and increase the second as needed. Conversely, the first parameter can be increased and the second parameter loser ed to open the limits for parts where wide variations in image gauging are acceptable. Normally, the first parameter should be lower than the second parameter.

Function 7 is a multiple parameter function that sets the number of comparison values that must be obtained in succession and the comparison value limit that must be met before the system has acquired sufficient data to recognize the part orientation when in the "LEARN" mode. Changing the second parameter value will change the comparison value limit. If parts to be learned have highly repeatable image data, the first parameter may be lowered and the second parameter may be increased to minimize time required during the "LEARN" mode. Conversely, if the data image is somewhat unstable, the first parameter may be increased and the second parameter lowered to ensure sufficient average image data is acquired.

Function 8 is a multiple display function. The first parameter value is a number that corresponds to the length of the time interval used in collecting the image data. The second parameter value is a number that corresponds to the average part length. The third parameter value is the number of orientations for the part selected.

Function 9 is a multiple display function that calculates and displays comparison values for each orientation of the currently selected part. It compares the averaged image data for each orientation with itself and each other orientation. The number of values displayed will be the square of the number of orientations taught for the currently selected part. The displayed values are useful in determining realistic values for the tolerances required for function 6. The first value displayed is orientation one compared with orientation one. Pressing the enter key displays orientation one compared with orientation two. This process is repeated to view all possible orientation comparisons.

Once a particular part is learned a binary envelope has been developed of the part in each orientation that has been learned. For instance in FIGS. 10 and 11 one part has been learned, that is the part shown in FIG. 2, in two different orientations. A first orientation shows the inclined edge leading (at the top of the page) and a second orientation shows the aperture end leading in FIG. 11. In both figures a envelope gauge is shown by the first two vertical columns of binary digits. The part being checked must be recognized to be within the parameters of these two envelopes. If for example the aperture is too large in a particular part its bit map will not be the same or less than the envelope for the hole. Likewise if the hole is too small it will fit inside the envelope and will not be recognized as conforming and will subsequently be rejected.

Thus it can be shown that the drawing figures hereof and this specification have set forth the applicant's improvement in article recognition and sorting devices and having thus described the invention, that which is believed to be news, and for which protection by letters patent is desired is:

We claim:

1. A method of assuring a work article being transported on a conveyor belt conforms to accepted tolerance of a sample article and is positioned on the belt in a desired orientation, comprising the steps of:

providing an array of optical sensors aligned transverse to the belt;

passing a plurality of sample articles, each of which is within accepted tolerances, past said array, in said desired orientation;

reading the output of said array at intervals along the length of each sample article;

creating inner and outer envelope patterns from the composite readings of said plurality of sample articles;

storing said patterns;

passing a work article past said array;

reading the output of said array at intervals comparable to those intervals on said sample articles;

comparing the read outputs for said work article with said stored envelope patterns;

removing said work article from said belt when said read outputs falls outside said patterns;

turning said work article to the desired orientation when said read outputs fall within said patterns and said comparison indicates said work article is positioned differently from said desired orientation; and allowing said work article to pass undisturbed when said read outputs fall within said patterns and said comparison indicates said article is positioned in said desired orientation.

2. Apparatus for assuring a work article is free of gross defects and is positioned in a desired orientation comprising:

a conveyor belt driven at a substantially uniform rate;

an array of optical sensors positioned adjacent said belt and aligned transverse thereto;

means for reading the output of said array at intervals along the length of a work article as it is transported by said belt;

memory means for storing inner and outer envelope patterns for an acceptable article;

processor means for comparing the composite read output for said work article with said patterns;

reject means for removing a work article from said belt and responsive to said processor means determining said article falls outside said envelope patterns; and reorienting means for turning said work article to said desired orientation in response to said processor means determining said article falls within said patterns but is positioned different from said desired orientation.

3. A method of creating an inner envelope pattern and an outer envelope pattern for use in comparing a work article with a desired orientation and tolerance of a similar sample article, comprising the steps of:

providing an array of vertically aligned optical sensors;

passing a plurality of different sample articles, each of which falls within acceptable tolerances, past said array;

reading the output of said array at selected intervals along the length of said work articles, to provide a composite output;

providing a first block of memory initially set at all ones;

providing a second block of memory initially set at all zeroes;

anding said composite output with said first block to determine said inner envelope; and oring said composite output with said second block to determine said outer envelope.

* * * * *